(12) United States Patent
Watanabe (10) Patent No.: US 12,174,777 B2
(45) Date of Patent: Dec. 24, 2024

(54) CONTROLLER, IMAGE FORMING APPARATUS, AND ACCESS ARBITRATION METHOD

(71) Applicant: Kenichi Watanabe, Kanagawa (JP)

(72) Inventor: Kenichi Watanabe, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 36 days.

(21) Appl. No.: 18/155,258

(22) Filed: Jan. 17, 2023

(65) Prior Publication Data
US 2023/0297535 A1    Sep. 21, 2023

(30) Foreign Application Priority Data

Mar. 15, 2022 (JP) ................................ 2022-040462

(51) Int. Cl.
*G06F 13/42* (2006.01)

(52) U.S. Cl.
CPC .. *G06F 13/4221* (2013.01); *G06F 2213/0026* (2013.01)

(58) Field of Classification Search
CPC ............. G06F 13/1605; G06F 13/1663; G06F 13/4221
See application file for complete search history.

(56) References Cited

U.S. PATENT DOCUMENTS

| | | | | |
|---|---|---|---|---|
| 10,949,258 B1* | 3/2021 | Kumar | ................... | G06F 9/4881 |
| 2005/0160188 A1* | 7/2005 | Bogin | ................... | G06F 13/161 710/1 |
| 2006/0224807 A1* | 10/2006 | Ishikawa | ................ | G06F 13/364 710/241 |
| 2010/0138574 A1 | 6/2010 | Watanabe | | |
| 2011/0179240 A1* | 7/2011 | Sukonik | .................. | G06F 12/08 711/158 |
| 2013/0250644 A1 | 9/2013 | Watanabe | | |
| 2016/0062927 A1* | 3/2016 | Saga | .................... | G06F 13/1673 710/308 |
| 2016/0077839 A1 | 3/2016 | Watanabe | | |
| 2016/0103619 A1* | 4/2016 | Lai | ...................... | G06F 13/1626 711/154 |
| 2019/0289156 A1 | 9/2019 | Watanabe et al. | | |
| 2020/0084150 A1* | 3/2020 | Burstein | ............... | H04L 47/805 |
| 2022/0058141 A1* | 2/2022 | Magro | ................ | G06F 12/1009 |
| 2022/0405214 A1* | 12/2022 | Shen | ................... | G06F 13/1642 |
| 2023/0244623 A1* | 8/2023 | McLean | ................ | G06F 13/372 710/117 |

FOREIGN PATENT DOCUMENTS

| | | |
|---|---|---|
| JP | 2011-053895 | 3/2011 |
| JP | 2013-077043 | 4/2013 |
| JP | 2019-003384 | 1/2019 |

* cited by examiner

*Primary Examiner* — Phong H Dang
(74) *Attorney, Agent, or Firm* — IPUSA, PLLC (57) ABSTRACT

A controller includes a plurality of communication interfaces, a first arbiter, and a second arbiter. The first arbiter arbitrates access to a memory. The second arbiter is disposed between the plurality of communication interfaces and the first arbiter. In response to reception of a plurality of outstanding read requests to the memory from one of the plurality of communication interfaces, the second arbiter limits the number of outstanding read requests to transmit to the first arbiter.

12 Claims, 5 Drawing Sheets

CONTROLLER, IMAGE FORMING APPARATUS, AND ACCESS ARBITRATION METHOD

CROSS-REFERENCE TO RELATED APPLICATION

This patent application is based on and claims priority pursuant to 35 U.S.C. § 119(a) to Japanese Patent Application No. 2022-040462, filed on Mar. 15, 2022, in the Japan Patent Office, the entire disclosure of which is hereby incorporated by reference herein.

BACKGROUND

Technical Field

Embodiments of this disclosure relate to a controller, an image forming apparatus, and an access arbitration method.

Related Art

There is an image processing apparatus that transfers image data in lines with a high-speed serial interface, such as a PERIPHERAL COMPONENT INTERCONNECT (PCI) EXPRESS interface, for transferring image data between a scanner or plotter and a controller.

There is also a data transfer device that accumulates read requests to a memory, stops issuing write requests to the memory when the number of read requests yet to be data-transferred reaches a first value, and suspends the issuance of write requests until the next read request is issued. This method reduces the read latency in reading from the memory.

If the communication interface (e.g., PCI EXPRESS interface) is connected to a plurality of devices, however, the above-described method may increase the read latency of one of the devices connected to the communication interface due to the access to the memory by another one of the devices.

SUMMARY

In one embodiment of this invention, there is provided a controller that includes, for example, a plurality of communication interfaces, a first arbiter, and a second arbiter. The first arbiter arbitrates access to a memory The second arbiter is disposed between the plurality of communication interfaces and the first arbiter. In response to reception of a plurality of outstanding read requests to the memory from one of the plurality of communication interfaces, the second arbiter limits the number of outstanding read requests to transmit to the first arbiter.

In one embodiment of this invention, there is provided an image forming apparatus that includes, for example, the above-described controller and an image processing device connected to the one of the plurality of communication interfaces.

In one embodiment of this invention, there is provided an access arbitration method that includes, for example, performing communication using a plurality of communication interfaces, performing a first arbitration process of arbitrating access to a memory, and performing a second arbitration process of, in response to reception of a plurality of outstanding access requests to the memory from one of the plurality of communication interfaces, limiting the number of outstanding access requests to be subjected to the first arbitration process.

BRIEF DESCRIPTION OF THE DRAWINGS

A more complete appreciation of embodiments of the present disclosure and many of the attendant advantages and features thereof can be readily obtained and understood from the following detailed description with reference to the accompanying drawings, wherein.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described in detail below. As used herein, the singular forms "a," "an," and "the" are intended to include the plural forms as well, unless the context clearly indicates otherwise.

Prior to the description of embodiments of the present disclosure, an image forming apparatus as an example of an electronic apparatus according to related art will be described.

Figure 4:
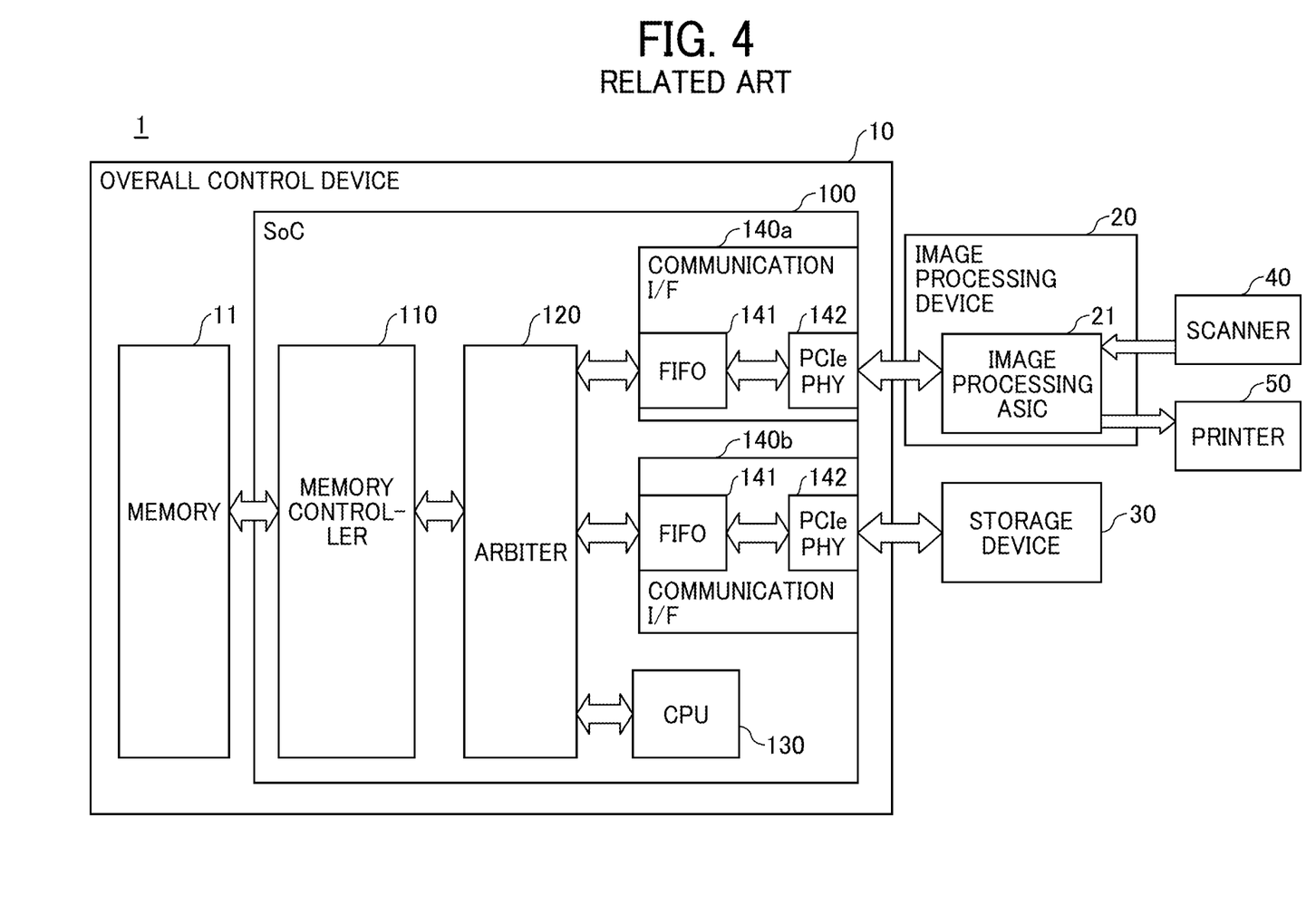
FIG. 4 is a diagram illustrating an exemplary hardware configuration of an image forming apparatus according to related art.

FIG. 4 is a diagram illustrating an exemplary hardware configuration of the image forming apparatus of the related art. An image forming apparatus 1 is a multifunction peripheral (MFP) with a plurality of functions such as a scan function, a copy function, a print function, and a facsimile function included in a housing, or is an electronic apparatus with an image forming function such as a copy machine, for example.

In the example of FIG. 4, the image forming apparatus 1 includes an overall control device 10, an image processing device 20, a storage device 30, a scanner 40, and a printer 50.

The overall control device (controller) 10 is a controller that performs overall control of the image forming apparatus 1. In the example of FIG. 4, the overall control device 10 is a control board with a memory 11, a memory controller 110, an arbiter 120, a central processing unit (CPU) 130, and a plurality of communication interfaces (I/Fs) 140a and 140b. In the following description, either one of the communication I/Fs 140a and 140b will be simply referred to as the communication I/F 140 where the distinction therebetween is unnecessary. The number of communication I/Fs 140 may be more than two.

In the example of FIG. 4, the memory controller 110, the arbiter 120, the CPU 130, and the I/Fs 140a and 140b are implemented by a system-on-a-chip (SoC) 100. The SoC 100 is a semiconductor device with components such as a processor (e.g., the CPU 130), a peripheral circuit, and an application circuit integrated on an integrated circuit (IC) chip. The SoC 100 is designed to function as a system. The SoC 100 is another example of the controller of the present example. That is, the controller of the present example may be a control board such as the overall control device 10 or a semiconductor device such as the SoC 100.

The memory 11 is a nonvolatile storage device such as a dynamic random access memory (DRAM), for example. The memory 11 may be a memory other than the DRAM. The memory controller 110 is a circuit that writes and reads data to and from the memory 11 and refreshes the DRAM, for example.

The arbiter 120 is a circuit that arbitrates access to the memory 11 and the memory controller 110 by the CPU 130 and the I/Fs 140a and 140b. The arbiter 120 is also called a bus arbiter. The CPU 130 is a processor (i.e., arithmetic device) that executes a particular program to control various functions of the image forming apparatus 1.

The communication I/F 140 is a communication interface for the communication with a device such as the storage device 30 or an image processing application specific integrated circuit (ASIC) 21 of the image processing device 20 in accordance with a standard such as PERIPHERAL COMPONENT INTERCONNECT (PCI) EXPRESS, for example. PCI EXPRESS (hereinafter referred to as PCIe) is a standard of serial transfer expansion interface for high-speed data communication. In the example of FIG. 4, the communication OF 140 includes a first-in, first-out (FIFO) 141 and a PCIe physical layer (PHY) 142. The FIFO 141 is a first-in, first-out buffer. The PCIe PHY 142, which is a circuit implementing the physical layer of PCIe, transmits and receives data to and from the device connected to the communication I/F 140.

The image processing device 20 is connected to the communication I/F 140a of the overall control device 10. The image processing device 20 controls the scanner 40 or the printer 50 to execute image processing such as copying, printing, or scanning, for example. In the example of FIG. 4, the image processing device 20 includes the image processing ASIC 21, which is an image processing device controlling the image processing such as copying, printing, or scanning, for example.

The scanner 40 is a reading device that reads a document, for example, under the control of the image processing ASIC 21. The printer 50 is a printing device that prints print data on a print medium under the control of the image processing ASIC 21.

The storage device 30 is a high-capacity storage device such as a solid state drive (SDD) or a hard disk drive (HDD), for example.

When the image forming apparatus 1 executes a copy process, for example, the image processing ASIC 21 reads a document with the scanner 40, performs image processing on data read from the document, and temporality stores the data in the memory 11 of the overall control device 10, for example. Further, when the printer 50 is ready, the image processing ASIC 21 acquires data from the memory 11 of the overall control device 10, performs image processing for printing on the data, and prints the data with the printer 50. The specifications of the above-described image processing vary depending on the manufacturer of the image forming apparatus 1. Further, the image processing is complicated and desired to achieve real-time performance. Therefore, the image processing is often implemented by an ASIC.

To transmit and receive high-volume image data with low latency, it is desirable to connect the image processing ASIC 21 to the overall control device 10 with the high-speed communication I/F 140 such as the PCIe interface.

An exemplary process of the image forming apparatus 1 will be described.

The image processing ASIC 21 of the image processing device 20 transmits write requests to the SoC 100 via the communication I/F 140a (e.g., PCIe interface) to write image data acquired by the scanner 40 to the memory 11 of the overall control device 10. The image processing ASIC 21 further transmits read requests to the SoC 100 via the communication I/F 140a (e.g., PCIe interface) to read image data stored in the memory 11.

The communication I/F 140a of the overall control device 10 temporarily stores, in the FIFO 141 thereof, the read requests and the write requests received from the image processing ASIC 21, and outputs the commands (i.e., requests) stored in the FIFO 141 to the arbiter 120 in order of storage such that the command stored first is output first.

The arbiter 120 arbitrates access requests to the memory 11 from modules such as the CPU 130 and the communication I/Fs 140a and 140b, which share the memory 11. In response to reception of a plurality of access requests to the memory 11, the arbiter 120 normally assigns the access right in a round robin manner. The assignment of the access right, however, is not limited thereto. For example, a module of high priority may be preferentially given the access right based on priority settings.

The PCIe standard has a function of allowing outstanding requests (hereinafter referred to as the outstanding request function). When a module such as the CPU 130 or the communication I/F 140a or 140b outputs an access request (first access request) to the arbiter 120, the module is normally not allowed to output the next access request to the arbiter 120 until the module receives the response to the first access request. The outstanding request function of PCIe allows the module to output the next access request to the arbiter 120 before receiving the response to the first access request output to the arbiter 120 by the module. Particularly, the response to a read request takes time due to the time taken for the SoC 100 to prepare read data corresponding to the read request. Therefore, continuously outputting read requests with the outstanding request function enhances the system performance.

An exemplary process of the image forming apparatus 1 in response to read requests will be described.

Figure 5:
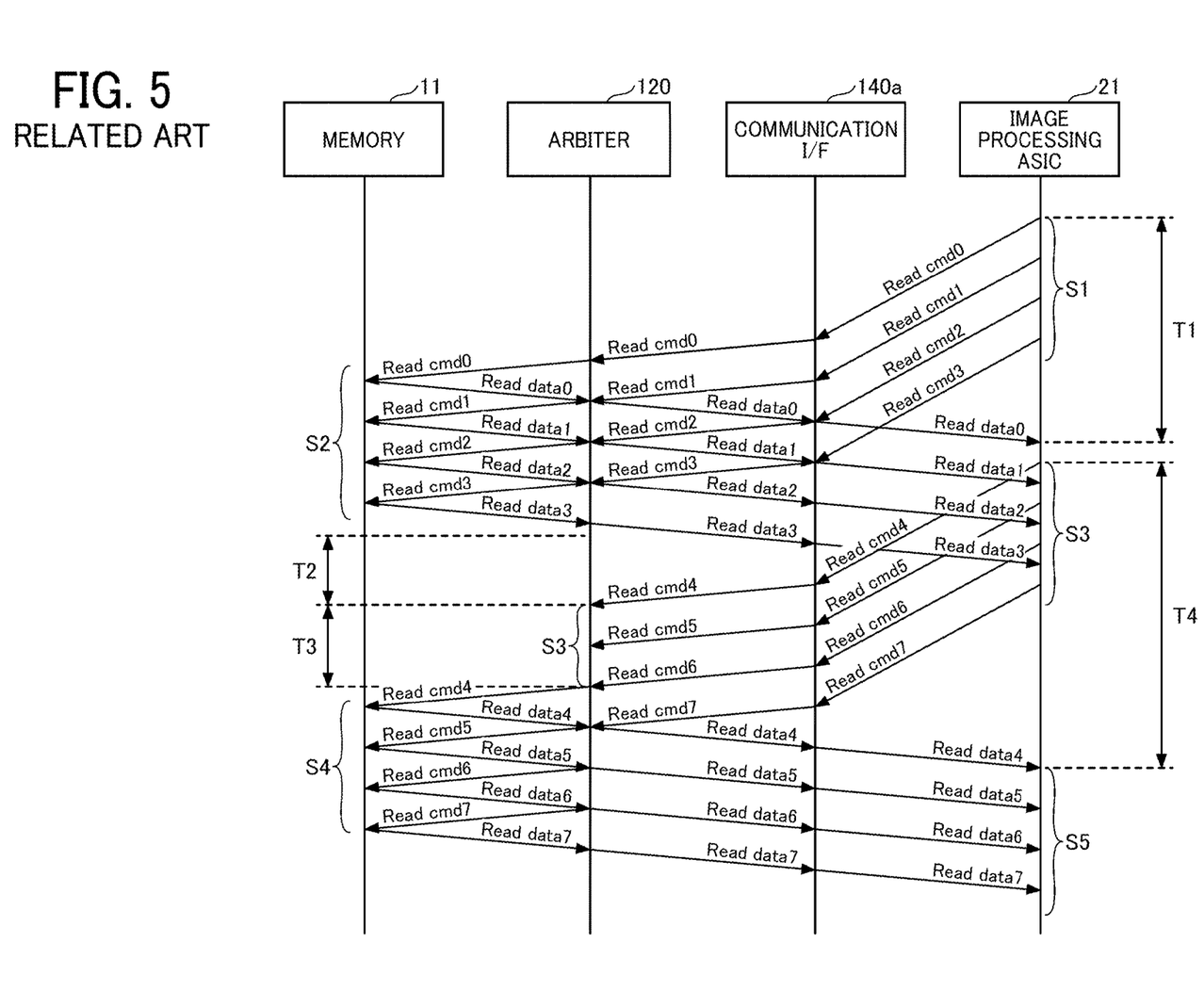
FIG. 5 is a sequence diagram illustrating an exemplary process of the image forming apparatus of the related art in response to read requests.

FIG. 5 illustrates an exemplary process performed when the image processing ASIC 21 outputs eight read requests to the communication I/F 140a of the SoC 100 in the image forming apparatus 1 illustrated in FIG. 4. It is assumed here that the communication I/F 140a is capable of receiving up to four outstanding read requests from the image processing ASIC 21 with the outstanding request function. When the communication I/F 140a has received a read request from a device such as the image processing ASIC 21 but has not returned the response to the read request, the read request will be hereinafter referred to as the outstanding read request.

At step S1 in FIG. 5, the image processing ASIC 21 sequentially transmits four read requests "Read cmd0," "Read cmd1," "Read cmd2," and "Read cmd3" to the communication I/F 140a of the SoC 100. Since the SoC 100 accepts up to four outstanding read requests, the image processing ASIC 21 then suspends the transmission of the next four read requests "Read cmd4," "Read cmd5," "Read cmd6," and "Read cmd7."

The communication I/F 140a sequentially transfers the four received read requests "Read cmd0" to "Read cmd3" to the arbiter 120, which sequentially transfers the four received read requests "Read cmd0" to "Read cmd3" to the memory 11. To make the description simple, the following description will be given on the assumption that the memory controller 110 is included in the memory 11.

At step S2, the memory controller 110 reads read data "Read data0," "Read data1," "Read data2," and "Read data3" from the memory 11 in response to the four received read requests "Read cmd0" to "Read cmd3," and sequentially outputs the read data "Read data0" to "Read data3" to the arbiter 120. The arbiter 120 outputs the four read data "Read data0" to "Read data3" received from the memory 11 to the communication I/F 140a, which sequentially transmits the four received read data "Read data0" to "Read data3" to the image processing ASIC 21.

At step S3, after receiving the read data "Read data0" from the communication I/F 140a, the image processing ASIC 21 transmits the next read request "Read cmd4" to the communication I/F 140a. Further, after receiving the read data "Read data1" from the communication I/F 140a, the image processing ASIC 21 transmits the next read request "Read cmd5" to the communication I/F 140a. Similarly, after receiving the read data "Read data2" from the communication I/F 140a, the image processing ASIC 21 transmits the next read request "Read cmd6" to the communication I/F 140a. Further, after receiving the read data "Read data3" from the communication I/F 140a, the image processing ASIC 21 transmits the next read request "Read cmd7" to the communication I/F 140a. The communication I/F 140a sequentially transfers the four received read requests "Read cmd4" to "Read cmd7" to the arbiter 120.

During a period T2 from the transmission by the arbiter 120 of the read data "Read data3" to the communication I/F 140a to the reception by the arbiter 120 of the read request "Read cmd4" from the communication I/F 140a, a device such as the storage device 30 may output an access request. If the storage device 30 outputs multiple write requests during the period T2, for example, a period T3 arises in step S3 before the arbiter 120 outputs the read requests "Read cmd4" to "Read cmd7" to the memory 11.

In this case, a delay is caused in the transmission of read data "Read data4," "Read data5," "Read data6," and "Read data7" from the memory 11 at step S4 and in the reception of the read data "Read data4" to "Read data7" by the image processing ASIC 21 at step S5, for example. Consequently, a read latency T4 of the read request "Read cmd4" is longer than a read latency T1 of the read request "Read cmd0," for example.

When printing with the printer 50, for example, the image processing ASIC 21 transmits print data to the printer 50 in time with the rotation of photoconductor drums included in the printer 50. The time period of this data transmission is called the line period. If the above-described read latency T4 of the read request "Read cmd4" exceeds the line period, the transmission of the print data fails to keep up with the rotation of the photoconductor drums, resulting in the formation of an abnormal image.

Figure 1:
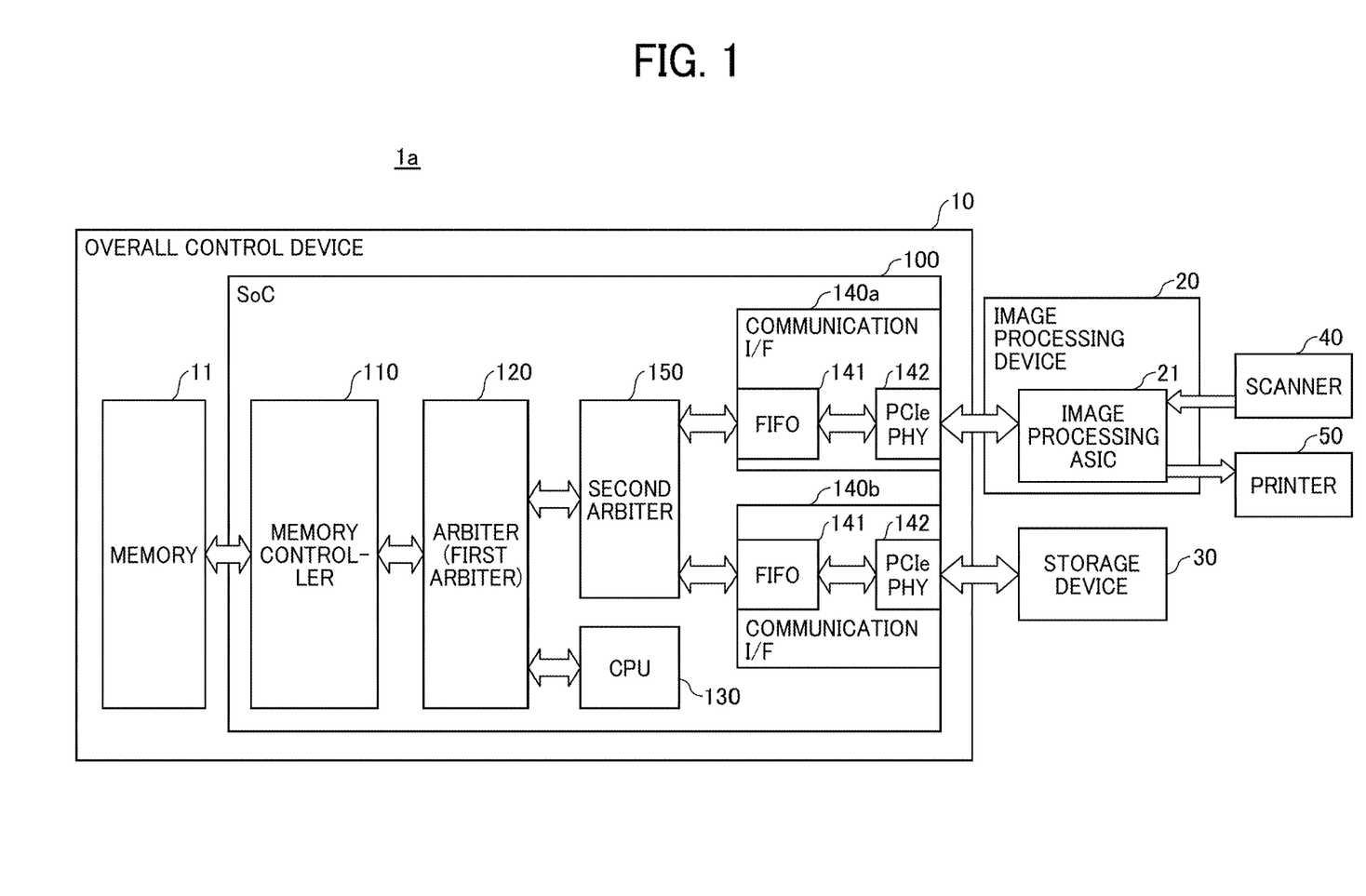
FIG. 1 is a diagram illustrating an exemplary hardware configuration of an image forming apparatus according to a first embodiment of the present invention.

To prevent the increase in the read latencies of a plurality of devices connected to the communication I/Fs 140, therefore, an image forming apparatus 1a according to a first embodiment of the present invention has the hardware configuration illustrated in FIG. 1, for example.

FIG. 1 is a diagram illustrating an exemplary hardware configuration of the image forming apparatus 1a of the first embodiment. The image forming apparatus 1a of the first embodiment includes, in addition to the hardware configuration of the image forming apparatus 1 illustrated in FIG. 4, an arbiter 150 disposed between the arbiter 120 and the communication I/Fs 140a and 140b. Hereinafter, the arbiter 120 and the arbiter 150 will be referred to as the first arbiter 120 and the second arbiter 150, respectively.

As well as the function of arbitrating the access requests from the communication I/Fs 140a and 140b, the second arbiter 150 has a function of, in response to reception of outstanding read requests from the communication I/F 140a, limiting the number of outstanding read requests to transmit to the first arbiter 120. For example, the second arbiter 150 limits the number of outstanding read requests to transmit to the first arbiter 120 to be less than the number of outstanding requests from the image processing ASIC 21. Herein, the number of outstanding requests is the number of outstanding read requests from the image processing ASIC 21 acceptable by the SoC 100.

As a specific example, out of the outstanding read requests received from the communication I/F 140a, the second arbiter 150 limits the number of outstanding read requests to output to the first arbiter 120 to one.

A process procedure of an access arbitration method of the first embodiment will be described.

Figure 2:
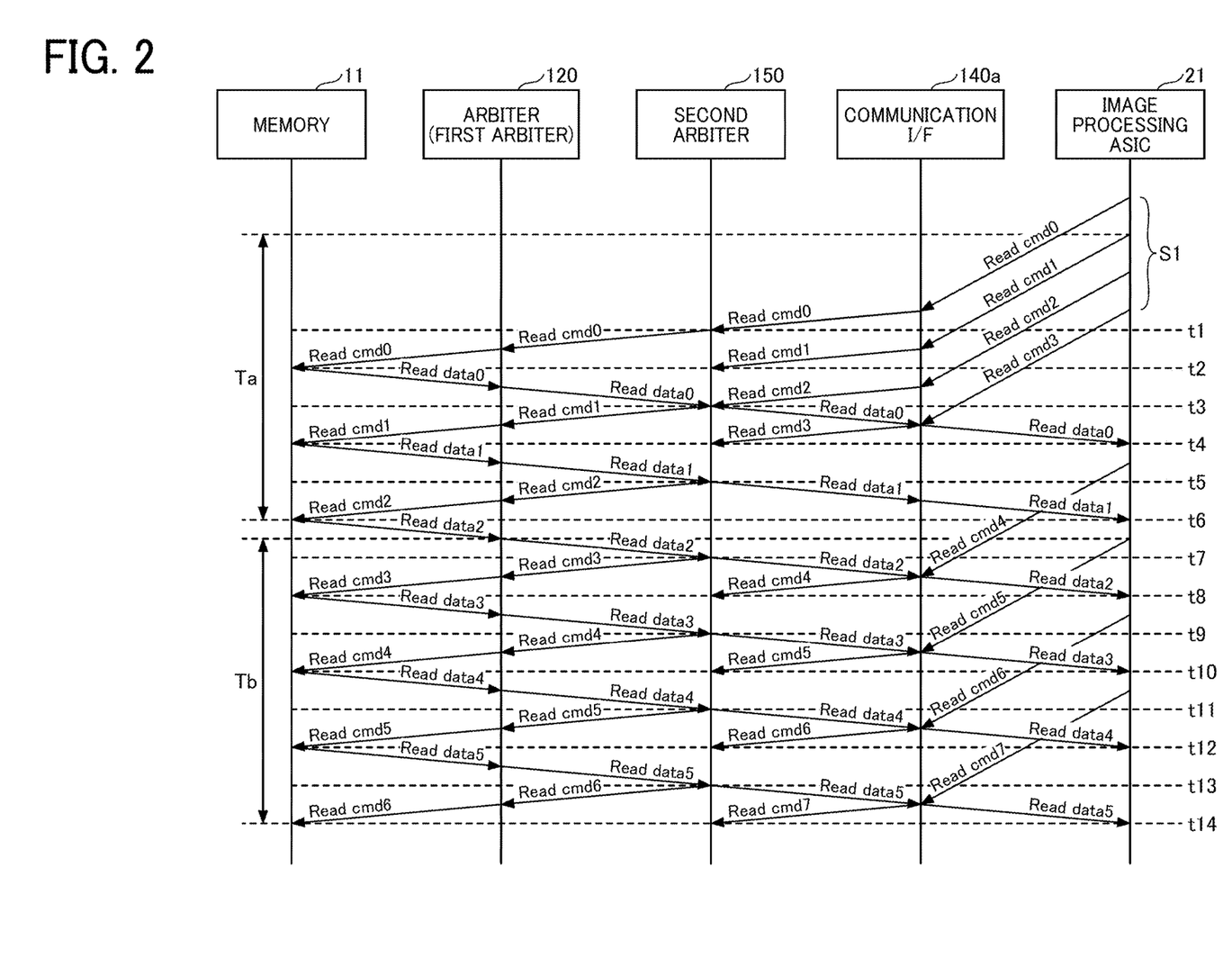
FIG. 2 is a sequence diagram illustrating an exemplary process of the image forming apparatus of the first embodiment in response to read requests.

FIG. 2 is a sequence diagram illustrating an exemplary process of the first embodiment in response to read requests. FIG. 2 illustrates an exemplary process performed when the image processing ASIC 21 outputs eight read requests to the communication I/F 140a of the SoC 100 in the image forming apparatus 1a illustrated in FIG. 1. It is assumed here that the communication I/F 140a is capable of receiving up to four outstanding read requests from the image processing ASIC 21 with the outstanding request function. It is also assumed that, out of the outstanding read requests received from the communication I/F 140a, the second arbiter 150 limits the number of outstanding read requests to output to the first arbiter 120 to one.

At step S1, the image processing ASIC 21 sequentially transmits the four read requests "Read cmd0" to "Read cmd3" to the communication I/F 140a of the SoC 100, similarly as in the process described above with FIG. 5. Since the SoC 100 accepts up to four outstanding read requests, the image processing ASIC 21 then suspends the transmission of the next four read requests "Read cmd4" to "Read cmd7."

The communication I/F 140a sequentially outputs the four received read requests "Read cmd0" to "Read cmd3" to the second arbiter 150.

At a time t1 in FIG. 2, the second arbiter 150 outputs the read request "Read cmd0" received from the communication I/F 140a to the first arbiter 120. Since the number of outstanding read requests to output to the first arbiter 120 is limited to one, the second arbiter 150 then suspends the output of the other received read requests "Read cmd1" to "Read cmd3."

The first arbiter 120 transmits the read request "Read cmd0" received from the second arbiter 150 to the memory 11. To make the description simple, the following description will be given on the assumption that the memory controller 110 is included in the memory 11.

At a time t2 in FIG. 2, the read data "Read data0" is read from the memory 11 in accordance with the received read request "Read cmd0," and is output to the second arbiter 150 via the first arbiter 120.

The second arbiter 150 is thereby ready to output the next read request "Read cmd1" to the first arbiter 120 at a time t3 in FIG. 2. At the time t3, the second arbiter 150 transmits the read data "Read data0" received from the first arbiter 120 to the image processing ASIC 21 via the communication I/F 140a, and outputs the next read request "Read cmd1" to the memory 11 via the first arbiter 120.

At a time t4 in FIG. 2, the read data "Read data1" is read from the memory 11 in accordance with the received read request "Read cmd1," and is output to the second arbiter 150 via the first arbiter 120. Since the image processing ASIC 21 is ready to output the next read request "Read cmd4" at the time t4, the image processing ASIC 21 transmits the read request "Read cmd4" to the second arbiter 150 via the communication I/F 140a.

At a time t5 in FIG. 2, the second arbiter 150 is ready to output the next read request "Read cmd2" to the first arbiter 120. At the time t5, the second arbiter 150 transmits the read data "Read data1" received from the first arbiter 120 to the image processing ASIC 21 via the communication I/F 140a, and outputs the next read request "Read cmd2" to the memory 11 via the first arbiter 120.

At a time t6 in FIG. 2, the read data "Read data2" is read from the memory 11 in accordance with the received read request "Read cmd2," and is output to the second arbiter 150 via the first arbiter 120. Since the image processing ASIC 21 is ready to output the next read request "Read cmd5" at the time t6, the image processing ASIC 21 transmits the read request "Read cmd5" to the second arbiter 150 via the communication I/F 140a.

The second arbiter 150 is ready to output the next read request "Read cmd3" to the first arbiter 120 at a time t7 in FIG. 2. At the time t7, the second arbiter 150 transmits the read data "Read data2" received from the first arbiter 120 to the image processing ASIC 21 via the communication I/F 140a, and outputs the next read request "Read cmd3" to the memory 11 via the first arbiter 120.

At a time t8 in FIG. 2, the read data "Read data3" is read from the memory 11 in accordance with the received read request "Read cmd3," and is output to the second arbiter 150 via the first arbiter 120. Since the image processing ASIC 21 is ready to output the next read request "Read cmd6" at the time t8, the image processing ASIC 21 transmits the read request "Read cmd6" to the second arbiter 150 via the communication I/F 140a.

The second arbiter 150 is ready to output the next read request "Read cmd4" to the first arbiter 120 at a time t9 in FIG. 2. At the time t9, the second arbiter 150 transmits the read data "Read data3" received from the first arbiter 120 to the image processing ASIC 21 via the communication I/F 140a, and outputs the next read request "Read cmd4" to the memory 11 via the first arbiter 120.

At a time t10 in FIG. 2, the read data "Read data4" is read from the memory 11 in accordance with the received read request "Read cmd4," and is output to the second arbiter 150 via the first arbiter 120. Since the image processing ASIC 21 is ready to output the next read request "Read cmd7" at the time t10, the image processing ASIC 21 transmits the read request "Read cmd7" to the second arbiter 150 via the communication I/F 140a.

The second arbiter 150 is ready to output the next read request "Read cmd5" to the first arbiter 120 at a time t11 in FIG. 2. At the time t11, the second arbiter 150 transmits the read data "Read data4" received from the first arbiter 120 to the image processing ASIC 21 via the communication I/F 140a, and outputs the next read request "Read cmd5" to the memory 11 via the first arbiter 120.

At a time t12 in FIG. 2, the read data "Read data5" is read from the memory 11 in accordance with the received read request "Read cmd5," and is output to the second arbiter 150 via the first arbiter 120.

The second arbiter 150 is ready to output the next read request "Read cmd6" to the first arbiter 120 at a time t13 in FIG. 2. At the time t13, the second arbiter 150 transmits the read data "Read data5" received from the first arbiter 120 to the image processing ASIC 21 via the communication I/F 140a, and outputs the next read request "Read cmd6" to the memory 11 via the first arbiter 120. The processes at a time t14 and thereafter are similar to the above-described ones, and thus description thereof will be omitted here.

With the process of FIG. 2, the read requests from the communication I/F 140a are continuously transmitted to the first arbiter 120. Further, during the continuous transmission of the read requests from the communication I/F 140a, the first arbiter 120 suspends the reception of access requests from the other communication I/F 140b. According to the first embodiment, therefore, the increase in the read latencies of the read requests "Read cmd1" to "Read cmd7" is prevented. For instance, the example of FIG. 2 indicates that a read latency Ta of the read request "Read cmd1" and a read latency Tb of the read request "Read cmd5" are similar in value.

The times t1 to t14 in FIG. 2 are illustrative, and do not represent the actual timing of the operation of hardware. It is desirable that the number of outstanding read requests to be transmitted to the first arbiter 120 by the second arbiter 150 is set by designers in accordance with the actual timing of the operation of hardware.

A second embodiment of the present invention will be described.

In receiving outstanding read requests to the memory 11 from the communication I/F 140a, the second arbiter 150 may limit the number of outstanding read requests to receive from the communication I/F 140a.

Figure 3:
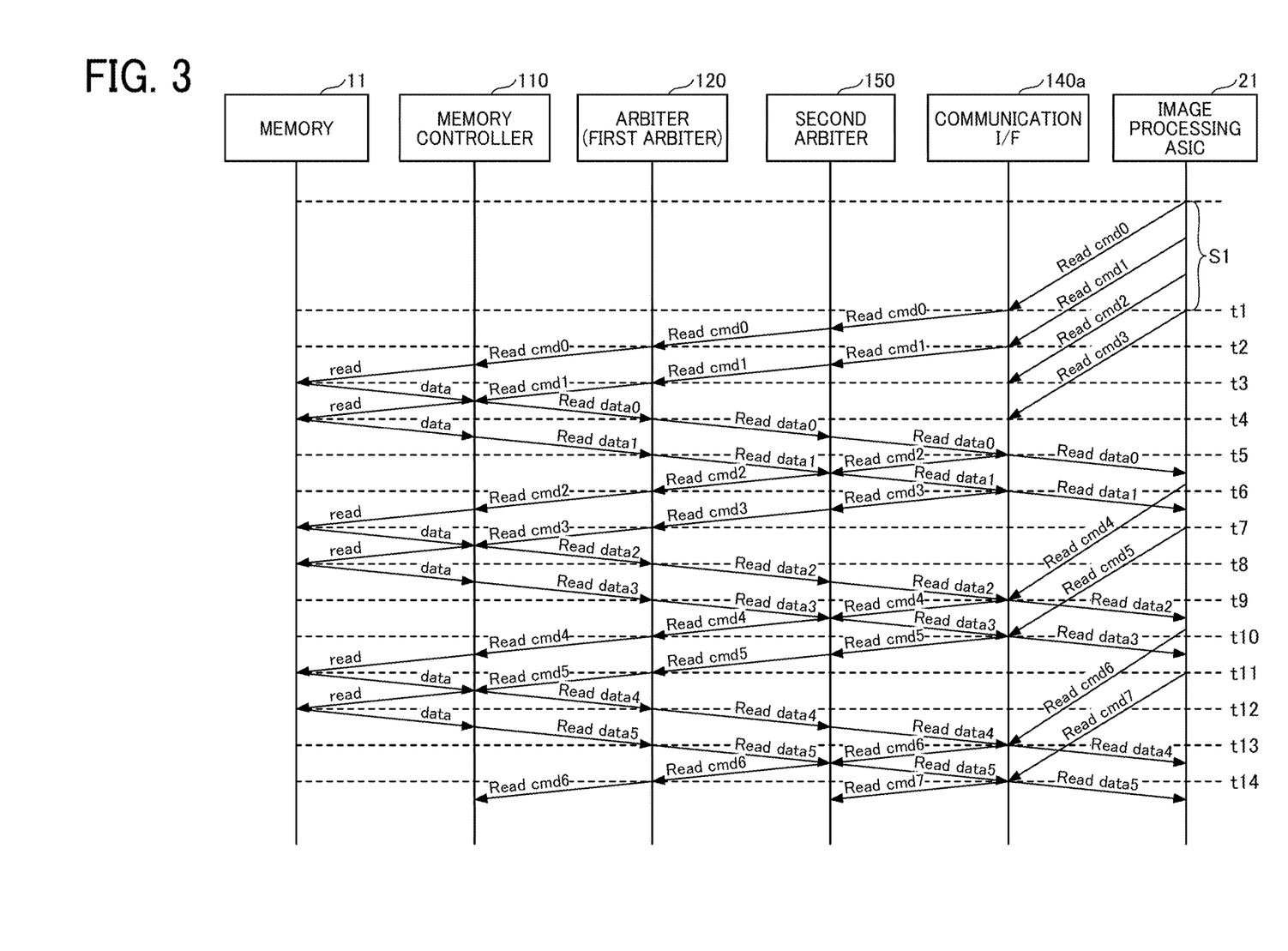
FIG. 3 is a sequence diagram illustrating an exemplary process of the image forming apparatus according to a second embodiment of the present invention in response to read requests.

FIG. 3 is a sequence diagram illustrating an exemplary process of the second embodiment in response to read requests. FIG. 3 illustrates another exemplary process performed when the image processing ASIC 21 outputs eight read requests to the communication I/F 140a of the SoC 100 in the image forming apparatus 1a illustrated in FIG. 1. It is assumed here that the communication I/F 140a is capable of receiving up to four outstanding read requests from the image processing ASIC 21 with the outstanding request function. It is also assumed that the second arbiter 150 limits the number of outstanding read requests to receive from the communication I/F 140a to two.

At step S1, the image processing ASIC 21 sequentially transmits the four read requests "Read cmd0" to "Read cmd3" to the communication I/F 140a of the SoC 100, similarly as in the processes described above with FIGS. 1 and 5. Since the SoC 100 accepts up to four outstanding read requests, the image processing ASIC 21 then suspends the transmission of the next four read requests "Read cmd4" to "Read cmd7."

At the time t1 in FIG. 3, the communication I/F 140a outputs the read request "Read cmd0" received from the image processing ASIC 21 to the second arbiter 150. At the time t2, the communication I/F 140a outputs the read request "Read cmd1" received from the image processing ASIC 21 to the second arbiter 150. Since the second arbiter 150 limits the number of outstanding read requests to receive from the communication I/F 140a to two, the two remaining read requests "Read cmd2" and "Read cmd3" are stored in the FIFO 141 of the communication I/F 140a.

The second arbiter 150 outputs the read requests "Read cmd0" and "Read cmd1" received from the communication I/F 140a to the memory controller 110 via the first arbiter 120. In the second embodiment of FIG. 3, the memory 11 and the memory controller 110 are illustrated separately.

The memory controller 110 reads the requested data from the memory 11 over the time t3 in FIG. 3, and outputs the read data "Read data0" to the second arbiter 150 via the first arbiter 120. The second arbiter 150 outputs the received read data "Read data0" to the communication I/F 140a. The communication I/F 140a is thereby ready to output the read request "Read cmd2" to the second arbiter 150 at the time t5.

The memory controller 110 reads the requested data from the memory 11 over the time t4 in FIG. 3, and outputs the read data "Read data1" to the second arbiter 150 via the first arbiter 120. The second arbiter 150 outputs the received read data "Read data1" to the communication I/F 140a. The communication I/F 140a is thereby ready to output the read request "Read cmd3" to the second arbiter 150 at the time t6.

At the time t5 in FIG. 3, the communication I/F 140a outputs the read request "Read cmd2" received from the image processing ASIC 21 to the second arbiter 150. Thereby, the second arbiter 150 outputs the read request "Read cmd2" received from the communication I/F 140a to the memory controller 110 via the first arbiter 120.

At the time t5, the communication I/F 140a further transmits the read data "Read data0" received from the second arbiter 150 to the image processing ASIC 21. The image processing ASIC 21 is thereby ready to transmit the next read request "Read cmd4." The image processing ASIC 21 therefore transmits the read request "Read cmd4" to the communication I/F 140a.

At the time t6 in FIG. 3, the communication I/F 140a outputs the read request "Read cmd3" received from the image processing ASIC 21 to the second arbiter 150. Thereby, the second arbiter 150 outputs the read request "Read cmd3" received from the communication I/F 140a to the memory controller 110 via the first arbiter 120.

At the time t6, the communication I/F 140a further transmits the read data "Read data1" received from the second arbiter 150 to the image processing ASIC 21. The image processing ASIC 21 is thereby ready to transmit the next read request "Read cmd5." The image processing ASIC 21 therefore transmits the read request "Read cmd5" to the communication I/F 140a.

The memory controller 110 reads the requested data from the memory 11 over the time t7 in FIG. 3, and outputs the read data "Read data2" to the second arbiter 150 via the first arbiter 120. The second arbiter 150 outputs the received read data "Read data2" to the communication I/F 140a. The communication I/F 140a is thereby ready to output the read request "Read cmd4" to the second arbiter 150 at the time t9.

The memory controller 110 reads the requested data from the memory 11 over the time t8 in FIG. 3, and outputs the read data "Read data3" to the second arbiter 150 via the first arbiter 120. The second arbiter 150 outputs the received read data "Read data3" to the communication I/F 140a. The communication I/F 140a is thereby ready to output the read request "Read cmd5" to the second arbiter 150 at the time t10.

At the time t9 in FIG. 3, the communication I/F 140a outputs the read request "Read cmd4" received from the image processing ASIC 21 to the second arbiter 150. Thereby, the second arbiter 150 outputs the read request "Read cmd4" received from the communication I/F 140a to the memory controller 110 via the first arbiter 120.

At the time t9, the communication I/F 140a further transmits the read data "Read data2" received from the second arbiter 150 to the image processing ASIC 21. The image processing ASIC 21 is thereby ready to transmit the next read request "Read cmd6." The image processing ASIC 21 therefore transmits the read request "Read cmd6" to the communication I/F 140a.

At the time t10 in FIG. 3, the communication I/F 140a outputs the read request "Read cmd5" received from the image processing ASIC 21 to the second arbiter 150. Thereby, the second arbiter 150 outputs the read request "Read cmd5" received from the communication I/F 140a to the memory controller 110 via the first arbiter 120.

At the time t10, the communication I/F 140a further transmits the read data "Read data3" received from the second arbiter 150 to the image processing ASIC 21. The image processing ASIC 21 is thereby ready to transmit the next read request "Read cmd7." The image processing ASIC 21 therefore transmits the read request "Read cmd7" to the communication I/F 140a.

At the time t11 in FIG. 3, the memory controller 110 reads the requested data from the memory 11, and outputs the read data "Read data4" to the second arbiter 150 via the first arbiter 120. The second arbiter 150 outputs the received read data "Read data4" to the communication I/F 140a. The communication I/F 140a is thereby ready to output the read request "Read cmd6" to the second arbiter 150.

At the time t12 in FIG. 3, the memory controller 110 reads the requested data from the memory 11, and outputs the read data "Read data5" to the second arbiter 150 via the first arbiter 120. The second arbiter 150 outputs the received read data "Read data5" to the communication I/F 140a. The communication I/F 140a is thereby ready to output the read request "Read cmd7" to the second arbiter 150.

At the time t13 in FIG. 3, the communication I/F 140a outputs the read request "Read cmd6" received from the image processing ASIC 21 to the second arbiter 150. Thereby, the second arbiter 150 outputs the read request "Read cmd6" received from the communication I/F 140a to the memory controller 110 via the first arbiter 120.

At the time t13, the communication I/F 140a further transmits the read data "Read data4" received from the second arbiter 150 to the image processing ASIC 21.

At the time t14 in FIG. 3, the communication I/F 140a outputs the read request "Read cmd7" received from the image processing ASIC 21 to the second arbiter 150. At the time t14, the communication I/F 140a further transmits the read data "Read data5" received from the second arbiter 150 to the image processing ASIC 21. The processes at the time t14 and thereafter are similar to the above-described ones, and thus description thereof will be omitted here.

With the process of FIG. 3, the transmission of read requests from the communication I/F 140a to the first arbiter 120 and the reading process are continuously performed. Further, during the continuous transmission of read requests from the communication I/F 140a and the continuous reading process, the first arbiter 120 suspends the reception of access requests from the other communication I/F 140b.

According to the second embodiment, therefore, the increase in the read latencies of the read requests "Read cmd1" to "Read cmd7" is prevented.

The times t1 to t14 in FIG. 3 are illustrative, and do not represent the actual timing of the operation of hardware. It is desirable that the number of outstanding read requests to be transmitted to the first arbiter 120 by the second arbiter 150 is set by designers in accordance with the actual timing of the operation of hardware.

As described above, when a plurality of devices are connected to a plurality of communication interfaces, the embodiments of the present invention prevent the increase in the read latencies of the devices connected to the communication interfaces.

In the above description of the embodiments, the electronic apparatus including the controller (e.g., the overall control device 10 or the SoC 100) is the image forming apparatus 1a. The controller, however, may be included in an electronic apparatus other than the image forming apparatus 1a.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

The invention claimed is:

1. A controller comprising:
a plurality of communication interfaces;
a first arbiter configured to arbitrate access to a memory; and
a second arbiter disposed between the plurality of communication interfaces and the first arbiter,
the second arbiter being configured to
receive a plurality of outstanding read requests to the memory from one of the plurality of communication interfaces, and
transmit a limited number of outstanding read requests among the received outstanding read requests to the first arbiter,
wherein
transmission of the outstanding read requests from the one of the plurality of communication interfaces to the first arbiter is continuously performed, and
while continuously performing the transmission of the outstanding read requests from the one of the plurality of communication interfaces, the first arbiter suspends reception of an access request from another one of the plurality of communication interfaces.

2. The controller of claim 1, wherein the one of the plurality of communication interfaces is connected to a device, and communicates with the device in accordance PERIPHERAL COMPONENT INTERCONNECT EXPRESS standard, and
wherein the limited number is less than a number of outstanding requests from the device.

3. The controller of claim 2, wherein the limited number is one.

4. The controller of claim 1, wherein each of the plurality of outstanding read requests is a read request to the memory from a device connected to the one of the plurality of communication interfaces, the controller receiving the read request after receiving a previous read request to the memory from the device and before returning a response to the previous read request to the device.

5. An image forming apparatus comprising:
the controller of claim 1; and
an image processing device connected to the one of the plurality of communication interfaces.

6. An access arbitration method comprising:
performing communication using a plurality of communication interfaces;
performing a first arbitration process of arbitrating access to a memory by a first arbiter;
receiving a plurality of outstanding read requests to the memory from one of the plurality of communication interfaces by a second arbiter; and
transmitting a limited number of outstanding read requests among the received outstanding read requests to the first arbiter,
wherein
transmission of the outstanding read requests from the one of the plurality of communication interfaces to the first arbiter is continuously performed, and
while continuously performing the transmission of the outstanding read requests from the one of the plurality of communication interfaces, the first arbiter suspends reception of an access request from another one of the plurality of communication interfaces.

7. The access arbitration method of claim 6, further comprising:
communicating with a device connected to the one of the plurality of communication interfaces in accordance with PERIPHERAL COMPONENT INTERCONNECT EXPRESS standard,
wherein the limited number is less than a number of outstanding requests from the device.

8. The access arbitration method of claim 7, wherein the limited number is one.

9. The access arbitration method of claim 6, wherein each of the plurality of outstanding read requests is a read request to the memory from a device connected to the one of the plurality of communication interfaces, the read request being received after reception of a previous read request to the memory from the device and before return of a response to the previous read request to the device.

10. A controller comprising:
a plurality of communication interfaces;
a first arbiter configured to arbitrate access to a memory; and
a second arbiter disposed between the plurality of communication interfaces and the first arbiter, the second arbiter being configured to
receive a limited number of outstanding read requests to the memory from one of the plurality of communication interfaces while other outstanding read requests are stored in the one of the plurality of communication interfaces,
transmit the limited number of outstanding read requests to the first arbiter, and
sequentially receive the other outstanding read request stored in the one of the plurality of communication interfaces, wherein
transmission of the outstanding read requests from the one of the plurality of communication interfaces to the first arbiter and read processes in response to the read requests are continuously performed, and
while continuously performing the transmission of the outstanding read requests from the one of the plurality of communication interfaces and the read processes, the first arbiter suspends reception of an access request from another one of the plurality of communication interfaces.

11. The controller of claim 10, wherein the limited number is two.

12. The controller of claim 1, wherein
the second arbiter is configured to transmit one of the outstanding read requests to the first arbiter after receiving read data from the first arbiter in response to a previous read request.

* * * * *